Figure 1:
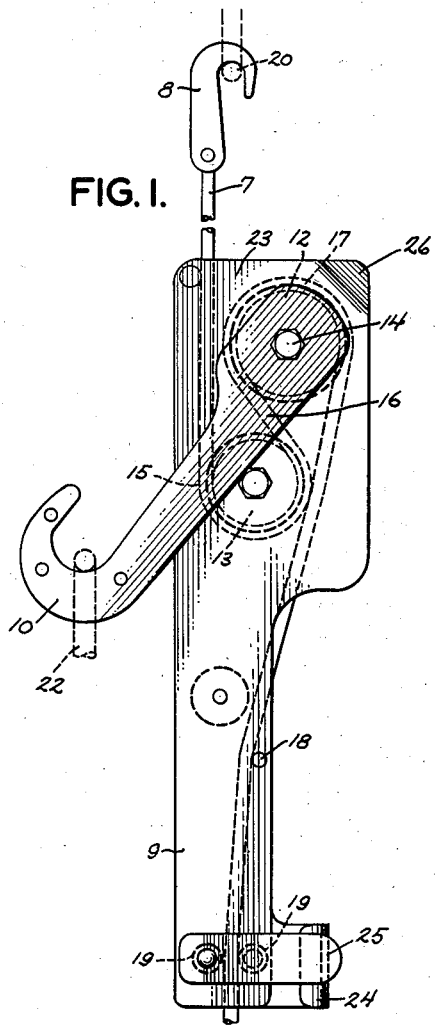

June 19, 1951     F. L. DAVIS     2,557,499

ADJUSTABLE CARGO TIE DOWN

Filed June 19, 1948

*INVENTOR.*
FRANK L. DAVIS

BY Philip S. Moreau.
ATTORNEY

Patented June 19, 1951

2,557,499

UNITED STATES PATENT OFFICE 2,557,499

ADJUSTABLE CARGO TIE-DOWN

Frank L. Davis, College Point, N. Y.

Application June 19, 1948, Serial No. 34,088

7 Claims. (Cl. 254—77)

The invention herein disclosed relates to apparatus for securing cargo and the broad purposes of the invention are to provide cargo securing means which can be quickly adjusted to proper length and then manipulated to take out the slack at that particular length and be secured in that length adjusted, tautened condition.

Particularly it is a purpose of the invention to provide a cargo tie-down which can be quickly attached, adjusted and secured by one man, thus to enable a single individual to secure cargo without having to wait for or depend upon the cooperation of a second individual or helper.

Special objects of the invention are to provide tie-down equipment of the character indicated which will combine lightness with strength and which will be of relatively simple, durable and inexpensive construction.

Also it is an object of the invention to provide a cargo tie-down of small size for its holding and securing capacity and which may be stowed in small space when not in use.

Other desirable objects and the novel features of construction, operation and use through which the objects of the invention are attained are set forth or will appear in the course of the following specification.

The drawing accompanying and forming part of the specification illustrates a present commercial embodiment of the invention but structure may be modified and changed as regards the immediate illustration, all within the true intent and broad scope of the invention as hereinafter defined and claimed.

Figure 2:
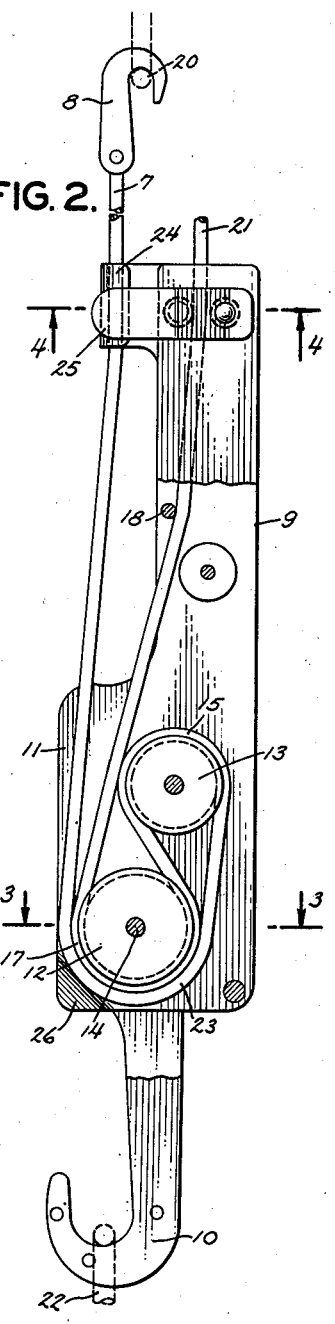
Figure 3:
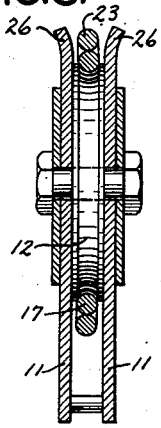
Figure 4:
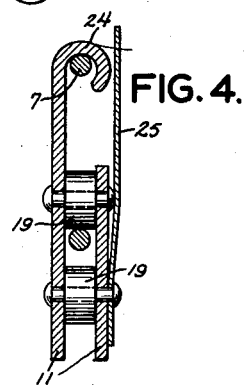

Fig. 1 in the drawing is a plan view of the tie-down showing the cable as attached to an anchorage and the take-up lever free for adjustment to suit the length of hold-down cable required;

Fig. 2 is a similar view showing the lever, after length adjustment, hooked to a stationary support and the lever turned up to take out slack and caught to the tightened length of cable;

Figs. 3 and 4 are enlarged cross sectional details on substantially the planes of lines 3—3 and 4—4 of Fig. 2.

The invention comprises a flexible connector 7, which for convenience may be herein referred to as a cable, arranged for connection with one anchorage or support and for such purpose usually provided with a hook 8 and a lever, designated 9, carrying a hook 10 or equivalent for connection with an opposing anchorage or support and carrying means both for securing the cable and for applying leverage to take up slack.

In the illustration the lever is made up of spaced companion plates 11 having a grooved fulcrum roll 12 journaled between them at one end and a snubber roll 13 inset inwardly from said fulcrum roll.

The hook 10 is shown pivoted on the axle or pintle 14 which carries the fulcrum roll.

The cable is shown in Fig. 1 as extending inwardly between the plates in a loop 15 about the snubber roll 13, thence in between the rolls at 16 and in a loop 17 about the fulcrum roll 12. It is confined in this relation by passing under a guide 18 and out the opposite end of the lever between opposed guides 19.

With the cable hook 8 caught to an anchorage loop or other support such as indicated at 20, Fig. 1, and the lever disposed substantially as there shown, the cable is free to ride around the rolls 12 and 13 and the lever therefore may be freely pulled out over the cable to gain a greater reach of cable or, on holding the loose or free end 21 of the cable, be ridden up over the cable to bring the hook 10 into position for engagement with an opposed or companion anchorage or support 22, for a thus shortened reach of holding cable.

After making fast the second or lever hook 10, the lever may be rocked counter-clockwise, Fig. 1, first to carry the loop of cable 17 on the fulcrum roll 12 into engagement with the fast stretch of cable at 23 whereby to lock the loop of cable 15 about the snubber roll and then, progressively, to roll the confined loop on the fulcrum roll up over the tightening stretch of cable 23. The leverage thereby applied, as will be seen by comparison of Figs. 1 and 2, will be equal to the radius of fulcrum roll 12 plus the diameter of the overlying, binding stretch of cable 23 and that introduced by the travel of the fulcrum point in rolling up over the stretched length of cable.

The lever is of such length as to make it easy to apply this leverage and as the maximum effect is attained the lever may be secured as by engaging a hook extension 24 on one of the plates at the free end of the lever over the holding stretch of cable. This hook or catch may be closed over by a spring retainer 25 which will yield to pass the cable into the hook in the first place or to clear the hook from the cable when the lever is to be released.

The corners of the plates forming the lever are shown as flared at 26 to guide this end of the lever over the loop 17 about the fulcrum roll as the lever is rocked from the free, Fig. 1, position to the cable securing and tightened position, Fig. 2.

The structure is simple and rugged and light in weight for the strength required; it can be folded for stowage in small space; the length adjusting and cable tightening operations are simple and easily performed, one as a succession of the other, and when the catch on the free end of the lever is caught over the cable the parts are positively locked in that relation. If slack results from vibration or movement of cargo, the free end of the lever can be released at any time and the lever slipped along the cable to take up the added slack and then again be rocked and caught to the cable to secure it tight in the newly adjusted position.

While the flexible connection 7 has been herein referred to as a cable, it will be appreciated that this cable may, in fact, be a rope, tape or other equivalent and such term is used in the broad, comprehensive sense. The same is true as to other terms employed, these being used in a descriptive rather than in a limiting sense.

While the invention is of particular utility as a cargo tie-down, it will be appreciated that it may be used for many other specific purposes, for one example, as a "come along" or pull jack for inching a heavy load or object over a floor or other supporting surface.

What is claimed is:

1. A cargo tie-down comprising a cable and a length adjusting and slack take-up lever, a fulcrum roll and anchor hook at one end of said lever, a snubber roll on the lever inset from said fulcrum roll and a cable catch on the opposite free end of the lever, said cable extending from the free end of the lever in a loop about the fulcrum roll, then in between the two rolls in a loop about the snubber roll and thence outward from the end of the lever and beyond the loop about the fulcrum roll, for attachment to an anchorage opposed to the anchorage with which the hook on the lever may be connected, all whereby said cable will pull freely about the rolls with the lever positioned to hold the loop on the fulcrum roll clear of the overlying cable, for length adjustment of the attached portion of cable and the free end of the lever may then be rocked over the cable first on the snubber roll and then on the fulcrum roll as a center, to bind the loop on the fulcrum roll against the anchored cable and then roll the bound loop in a tightening relation over the cable to a position where the catch will engage over the tautened cable to secure the parts in such relation.

2. A cargo tie-down comprising a cable and a length adjusting and slack take-up lever, a fulcrum roll and anchor hook at one end of said lever, a snubber roll on the lever inset from said fulcrum roll and a cable catch on the opposite free end of the lever, said cable extending from the free end of the lever in a loop about the fulcrum roll, then in between the two rolls in a loop about the snubber roll and thence outward from the end of the lever and beyond the loop about the fulcrum roll, for attachment to an anchorage opposed to the anchorage with which the hook on the lever may be connected, all whereby said cable will pull freely about the rolls with the lever positioned to hold the loop on the fulcrum roll clear of the overlying cable, for length adjustment of the attached portion of cable and the free end of the lever may then be rocked over the cable first on the snubber roll and then on the fulcrum roll as a center, to bind the loop on the fulcrum roll against the anchored cable and then roll the bound loop in a tightening relation over the cable to a position where the catch will engage over the tautened cable to secure the parts in such relation, said hook being pivoted to the lever on the same center as said fulcrum roll.

3. A cargo tie-down comprising a cable and a length adjusting and slack take-up lever, a fulcrum roll and anchor hook at one end of said lever, a snubber roll on the lever inset from said fulcrum roll and a cable catch on the opposite free end of the lever, said cable extending from the free end of the lever in a loop about the fulcrum roll, then in between the two rolls in a loop about the snubber roll and thence outward from the end of the lever and beyond the loop about the fulcrum roll, for attachment to an anchorage opposed to the anchorage with which the hook on the lever may be connected, all whereby said cable will pull freely about the rolls with the lever positioned to hold the loop on the fulcrum roll clear of the overlying cable, for length adjustment of the attached portion of cable and the free end of the lever may then be rocked over the cable first on the snubber roll and then on the fulcrum roll as a center, to bind the loop on the fulcrum roll against the anchored cable and then roll the bound loop in a tightening relation over the cable to a position where the catch will engage over the tautened cable to secure the parts in such relation and means on said lever for confining the cable in the double looped formation about the fulcrum and snubber rolls described.

4. A cargo tie-down comprising a cable and a length adjusting and slack take-up lever, a fulcrum roll and anchor hook at one end of said lever, a snubber roll on the lever inset from said fulcrum roll and a cable catch on the opposite free end of the lever, said cable extending from the free end of the lever in a loop about the fulcrum roll, then in between the two rolls in a loop about the snubber roll and thence outward from the end of the lever and beyond the loop about the fulcrum roll, for attachment to an anchorage opposed to the anchorage with which the hook on the lever may be connected, all whereby said cable will pull freely about the rolls with the lever positioned to hold the loop on the fulcrum roll clear of the overlying cable, for length adjustment of the attached portion of cable and the free end of the lever may then be rocked over the cable first on the snubber roll and then on the fulcrum roll as a center, to bind the loop on the fulcrum roll against the anchored cable and then roll the bound loop in a tightening relation over the cable to a position where the catch will engage over the tautened cable to secure the parts in such relation, said catch including an angularly disposed hook at the free end of the lever open toward the cable and a cable retaining spring closure over the open side of said hook.

5. A cargo tie-down comprising a cable and a length adjusting and slack take-up lever, a fulcrum roll and anchor hook at one end of said lever, a snubber roll on the lever inset from said fulcrum roll and a cable catch on the opposite free end of the lever, said cable extending from the free end of the lever in a loop about the fulcrum roll, then in between the two rolls in a loop about the snubber roll and thence outward from the end of the lever and beyond the loop about the fulcrum roll, for attachment to an anchorage opposed to the anchorage with which the hook on the lever may be connected, all whereby said cable will pull freely about the rolls with the lever positioned to hold the loop on the fulcrum roll clear of the overlying cable, for length adjustment of the attached portion of cable and the free end of the lever may then be rocked over the cable first on the snubber roll and then on the fulcrum roll as a center, to bind the loop on the fulcrum roll against the anchored cable and then roll the bound loop in a tightening relation over the cable to a position where the catch will engage over the tautened cable to secure the parts in such relation, said lever being composed of spaced side plates with the rollers journaled therebetween and having means for guiding the overlying portion of the cable over the loop on the fulcrum roll.

6. A cargo tie-down comprising a cable and a length adjusting and slack take-up lever, a fulcrum roll and anchor hook at one end of said lever, a snubber roll on the lever inset from said fulcrum roll and a cable catch on the opposite free end of the lever, said cable extending from the free end of the lever in a loop about the fulcrum roll, then in between the two rolls in a loop about the snubber roll and thence outward from the end of the lever and beyond the loop about the fulcrum roll, for attachment to an anchorage opposed to the anchorage with which the hook on the lever may be connected, all whereby said cable will pull freely about the rolls with the lever positioned to hold the loop on the fulcrum roll clear of the overlying cable, for length adjustment of the attached portion of cable and the free end of the lever may then be rocked over the cable first on the snubber roll and then on the fulcrum roll as a center, to bind the loop on the fulcrum roll against the anchored cable and then roll the bound loop in a tightening relation over the cable to a position where the catch will engage over the tautened cable to secure the parts in such relation, the end of the cable extending from about the snubber roll having a hook for connecting the cable with an anchorage so that the lever can then be freely pulled back from the anchorage over the cable to a point where the hook thereon may be connected with an opposing anchorage.

7. A cargo tie-down comprising a lever, an anchorage hook pivotally connected with one end of said lever, a fulcrum roll at said end of said lever, a snubber roll on said lever inward from said fulcrum roll, a cable looped about said fulcrum roll and looped about said snubber roll and extending from said snubber roll in binding engagement over said loop on the fulcrum roll for connection with an anchorage opposed to an anchorage with which the hook may be connected and means for holding the lever on the cable with the anchorage connected portion of the cable in binding engagement with the loop about the fulcrum roll.

FRANK L. DAVIS.

REFERENCES CITED

The following references are of record in the file of this patent:

UNITED STATES PATENTS

| Number | Name | Date |
|---|---|---|
| 541,925 | Emery | July 2, 1895 |
| 1,204,919 | Wightman | Nov. 14, 1916 |
| 1,237,599 | Anderson | Aug. 21, 1917 |
| 2,431,819 | Meyer | Dec. 2, 1947 |
| 2,478,994 | White | Aug. 16, 1949 |